United States Patent [19]

Baumgarten

[11] Patent Number: 5,324,108
[45] Date of Patent: Jun. 28, 1994

[54] ARRANGEMENT FOR PIN CYLINDER EXTRUDERS

[75] Inventor: Wilfried Baumgarten, Pattensen, Fed. Rep. of Germany

[73] Assignee: Kleinewefers Kunststoffanlagen GmbH, Munich, Fed. Rep. of Germany

[21] Appl. No.: 49,969

[22] Filed: Apr. 20, 1993

Related U.S. Application Data

[63] Continuation of Ser. No. 773,559, filed as PCT/EP91/00601 on Mar. 27, 1991, abandoned.

[30] Foreign Application Priority Data

Apr. 2, 1990 [DE] Fed. Rep. of Germany ....... 4010540

[51] Int. Cl.⁵ ........................ B01F 7/08; B01F 15/06
[52] U.S. Cl. .......................................... 366/80; 366/75; 366/147; 366/307; 425/203; 425/208
[58] Field of Search ............. 425/200, 203, 208, 379.1; 264/211.21, 211.23; 366/75, 76, 97, 98, 139, 144, 147, 168, 172, 99, 80, 90, 302, 303, 307, 304

[56] References Cited

U.S. PATENT DOCUMENTS

| | | | |
|---|---|---|---|
| 1,184,016 | 5/1916 | Price | 366/80 |
| 1,848,236 | 3/1932 | Anderson | 366/90 X |
| 1,849,291 | 3/1932 | Gordon . | |
| 3,193,877 | 7/1965 | Edwards | 366/75 |
| 3,348,820 | 10/1967 | Wilkinson et al. | 366/64 |
| 3,430,924 | 3/1969 | Hosokawa et al. | 366/172 |
| 3,482,822 | 12/1969 | Krizak et al. | 366/303 X |
| 3,938,783 | 2/1976 | Porter | 366/307 X |
| 3,970,113 | 7/1976 | Guttinger et al. | 425/204 X |
| 3,981,658 | 9/1976 | Briggs | 425/208 X |
| 4,155,690 | 5/1979 | Checkland et al. | 425/376.1 X |
| 4,178,104 | 12/1979 | Menges et al. | 366/80 |
| 4,347,003 | 8/1982 | Anders | 366/75 |
| 4,400,218 | 8/1983 | Koch et al. | 366/85 X |
| 4,504,150 | 3/1985 | De Vries | 366/80 |
| 4,508,454 | 4/1985 | Anders | 366/90 X |
| 4,538,917 | 9/1985 | Harms | 366/80 X |
| 4,581,992 | 4/1986 | Koch | 366/90 X |
| 4,629,326 | 12/1986 | Huls | 366/80 |
| 4,629,327 | 12/1986 | Capelle | 366/80 |
| 4,640,672 | 2/1987 | Ellwood | 425/208 X |
| 4,657,499 | 4/1987 | Lewellen et al. | 366/90 X |
| 4,723,901 | 2/1988 | Sarumaru | 425/208 |
| 4,735,565 | 4/1988 | Capelle | 425/208 |
| 4,900,494 | 2/1990 | Wobbe | 366/75 X |
| 4,901,635 | 2/1990 | Williams | 366/88 X |
| 4,960,328 | 10/1990 | Schumacher et al. | 366/80 |
| 5,064,586 | 11/1991 | Higashijima | 425/203 X |

FOREIGN PATENT DOCUMENTS

| | | | |
|---|---|---|---|
| 68332 | 1/1983 | European Pat. Off. | 425/208 |
| 0137813 | 1/1903 | Fed. Rep. of Germany . | |
| 1454801 | 9/1972 | Fed. Rep. of Germany . | |
| 2259040 | 7/1973 | Fed. Rep. of Germany . | |
| 2406925 | 8/1975 | Fed. Rep. of Germany . | |
| 3221472 | 6/1984 | Fed. Rep. of Germany . | |
| 2235784 | 1/1986 | Fed. Rep. of Germany . | |
| 3506424 | 8/1986 | Fed. Rep. of Germany . | |
| 3503911 | 9/1986 | Fed. Rep. of Germany . | |
| 3613584 | 11/1986 | Fed. Rep. of Germany . | |
| 3534097 | 4/1987 | Fed. Rep. of Germany | 366/79 |
| 3502437 | 8/1988 | Fed. Rep. of Germany . | |
| 3613612 | 10/1988 | Fed. Rep. of Germany . | |
| 3805849 | 9/1989 | Fed. Rep. of Germany . | |
| 3811186 | 10/1989 | Fed. Rep. of Germany . | |
| 111570 | 2/1976 | France | 366/66 |
| 1184555 | 10/1987 | Italy . | |
| 889477 | 12/1981 | U.S.S.R. | 366/79 |

*Primary Examiner*—Harvey C. Hornsby
*Assistant Examiner*—Charles Cooley

[57] ABSTRACT

A screw extruder having a barrel with a longitudinal bore for receiving a rotatable screw, a transverse bore disposed in the barrel tangential to the longitudinal bore for receiving and supporting a pin wherein the pin extends partially into the longitudinal bore. The tangential arrangement of the pin substantially decreases the susceptability of the pin to bending or breaking. The pin may also be adjustably positioned in the transverse bore and further may be subject to thermal heating and cooling.

12 Claims, 4 Drawing Sheets

ARRANGEMENT FOR PIN CYLINDER EXTRUDERS

This application is a continuation of application Ser. No. 07/773,559, filed as PCT/EP91/00601 on Mar. 27, 1991, now abandoned.

BACKGROUND OF THE INVENTION

The invention relates to a screw extruder in whose barrel, which accommodates at least one screw, bores are provided to accommodate pins which are arranged in radial planes and which reach into the barrel.

Such extruders have become known as pin-and-barrel extruders in a variety of embodiments, wherein the pins reach radially into the barrel and engage the gullets of the spiral screw. Such pin-and-barrel extruders are used mainly in single-screw extruders. It is precisely in these machines that the pins have acquired special importance in the plastification and mixing of the material to be extruded. They have been used in accordance with DE-A-01 37 813 for dough kneading and meat grinding machines. Pin extruders in accordance, for example, with U.S. Pat. No. 1,848,236, have been used in sausage manufacture. In the case of many other kinds of materials, such as those which have to be dewatered, special pin extruders have been disclosed, as in German Patent 1,454,801.

Pin extruders have acquired very great economic importance in the rubber industry through German Patent 22 35 784, since it was made possible by these machines to achieve high throughputs by means of cold-fed extruders (more than about 6000 kg/h). Cold feeding eliminates the need for large preheating machines for the formerly common hot-loaded extrusion, and has already been used world-wide in applications in the rubber industry which has to handle large throughputs, namely in the tire and conveyor belt industry. The problem has arisen that many of the cold-fed rubber mixtures, which are usually charged in the form of a continuous hide, were so hard or tough and require such great forces for plastification, that such radially disposed pins were subject to heavy wear, or in the most unfavorable case were even bent or broken. This has occasionally caused severe damage to the machinery. Attempts have of course been made to counteract this wear and this danger of breakage by appropriately designing the pins, and by improving the selection and treatment of the material. These efforts, however, are basically unsatisfactory, since at least after some amount of unavoidable pin wear the danger of breakage again arises, even when such danger did not exist when they were new. Pins with a shorter depth of penetration have also been used, or pins whose depth adjustment is variable, e.g., in accordance with DE-A-35 03 911 or DE-A-35 06 424. In that case, however, there is the disadvantage that a shorter working length or depth also results in lower effectiveness in plastification, which of course is undesirable.

Depth-adjustability also suffers from the possibility of error in critical cases by setting the pins too deep for the hardness of the composition to be plastified, and hence to cause damage to the pins.

Also, the complexity and cost of providing for the adjustment of the numerous pins are so high that only very little use has been made of it.

Pin-breakage alarm devices have also been disclosed, e.g., in German Patent Application 32 21 472, but they do not eliminate the danger of pin breakage, but rather increase it further because they weaken the pins, and they do no more than reduce the consequential damage, which they can hardly prevent. An improvement, if they are given the best possible configuration and are made of the best pin material, are the bent-pin alarms in accordance with German Patent Application 35 02 437, which permit the extruder to be shut down before appreciable damage has been done. These safety devices are relatively expensive, since a sensor is required for every endangered pin. Therefore, they are seldom used.

On account of the desired plastifying action of the pins, considerable friction heating is produced on the pins themselves in the extruding process, which manifests itself in the temperature rise in the particles of the mixture and in the pins. This heating, however, is ultimately disadvantageous and limits the maximum screw speed of the extruder, and hence also the extruder output and economy of operation.

A cooling of the pins already proposed in German Patent Application 22 35 784 has not yet been reduced to practice on account of the limited strength of the pins as described above.

One problem of pin extruders in the working of sticky compositions, such as many rubber mixtures which stick to the walls, consists in the adherence of mixture residues on the lee side of the pins--the so-called "dead corners." At least a partial fouling of the working chamber of the machine must in these cases be accepted when the machine is shut down. It is often cleaned up by running a cleaning mixture through it afterward, or when the extruder is restarted a certain initial fouling of the mixture must be tolerated, but both methods must be considered disadvantageous.

German Patent Application 38 05 849 provides for skewed pins which are intended to solve the problem of sticking mixtures and "dead corners," but this is possible only in an absolutely inadequate manner if the pins are not to be too greatly weakened. The same applies for similar reasons in the case of the streamlined pins according to German Patent Applications 36 13 584 and 36 13 612, which due to their configuration are suitable only for compositions that are not very difficult to work.

An invention covered by Italian patent 11 84 555 attempts to lessen the disadvantages and problems regarding strength by a nonradial arrangement, i.e., by setting the pins askew in the range of action of the extruder screw. The disadvantage of this construction is that the pins are made with a skewed or arcuate bottom surface and have to be mounted and secured at absolutely correct angles, which is not only expensive but also is hard to guarantee in the long run. The danger of breakage is reduced but not eliminated. Moreover, the problem of the "dead corners" is still worse than it is in the radial pin arrangement. The barrel cannot be made with a replaceable wear sleeve, and the available cooling surface area is less than in conventional extruders, so that throughput and economy are reduced. This type of construction has therefore not been accepted.

SUMMARY OF THE INVENTION

The invention avoids the disadvantages of the state of the art. It is the object of the invention to create a pin-and-barrel extruder whose pins basically cannot bend or break, whose pins can be easily temperature-controlled, and whose pins are adjustable in their action in many ways and adaptable to the various requirements.

The invention consists in arranging the axes of the pins tangential to or parallel with the tangents of the screws with a portion of the pins residing within a gullet of the screw.

Whereas in the state of the art the pins are disposed radially and therefore the loads attack the pin radially and consequently can break it, this danger is eliminated in the arrangement of the pins according to the invention. In this arrangement the plastifying and mixing action of the pins is achieved in another way, namely by narrowing gang parts, which makes the softening and plastification of material substantially better.

One embodiment consists in mounting the pins in a bore with their free ends projecting freely into the barrel. The pins can stand like a thorn against the stream of material, but also stand in the direction of the material flow. In both cases it is brought about that the forces acting on the pin cannot act entirely radially on the pin, but always only with a radial component. If pieces of metal should undesirably enter the material stream, these metal pieces attack not the end but the middle parts of the pin and thus exert less moment on the pin than is the case with conventional radial pins.

Also important is an embodiment of the pin projecting freely into the barrel, in which the pin end extends tangentially in the groove interrupting the spirals of the screw, leaving a slight gap between it and the bottom of the groove. In this case, pieces of metal which have undesirably entered into the stream of material do slightly bend the pin, so that its end comes in contact with the bottom of the groove, but these metal pieces cannot break the pin.

In this embodiment of the pin system it is advantageous for the pins to be tapered or elliptical in longitudinal section, or unround in cross section at their portion situated within the barrel. By this configuration, the plastifying action can be set so as to be well adapted to the material being plastified.

Another possibility for the arrangement of the pins that results in complete security against breaking is for the pins to be mounted with both ends held in bores in the barrel. Pins arranged in this manner can also be very easily heated or cooled if it is possible to use one pin end as the input for the coolant and the other pin end as the output for it. In these pins their action can also be varied during operation without replacing them if the pins are unround in cross section at least over a portion of their length inside of the barrel and can be rotated during operation.

Another possibility for mounting the pins in the barrel is for the bore to be located in the inner wall of the barrel such that only a portion of the circumference of the installed pin reaches into the interior of the barrel. As seen inside of the barrel, such circumferential pin surfaces look like bolsters. The result is a very special plastifying, softening and mixing action different from the conventional.

It is advantageous for the pins to be provided with at least one passage for holding or carrying a temperature control medium. It is precisely at the pins that the plastifying, softening and mixing work which they perform results in a special temperature elevation. The heating of the material that here occur can be counteracted by cooling the pins. The cooling means can be cooling devices or fluid coolants. In special cases, in which an additional temperature increase is desired, heating devices can be installed in the pins or a heating medium such as hot water or steam can be passed through the pins.

Without danger, the pins can also be provided with bores to accommodate sensors or transducers.

In many cases it will be desirable to provide the tangentially disposed pins in one plane, preferably in the first plane, and to provide radially disposed pins in additional planes. Thus the different mixing actions of the different pin systems can be used together in one and the same extruder. Special effects can be produced by providing portions of the circumferential surfaces of the pins with recesses, especially in the form of grooves, which are preferably set askew. This substantially accelerates the softening of the material, because material that has already been softened can more easily escape in the direction of movement, while the grooves themselves act on the material that has not yet been softened.

It may be advantageous to provide exhaust systems in back of the pins, as seen in the direction of flow, because here in the lee of the pins is an especially good location for the removal of gas present or formed in the material.

BRIEF DESCRIPTION OF THE DRAWINGS

The essence of the invention will be explained below with the aid of embodiments represented diagrammatically in the drawings, wherein.

DESCRIPTION OF THE PREFERRED EMBODIMENTS

Figure 1:
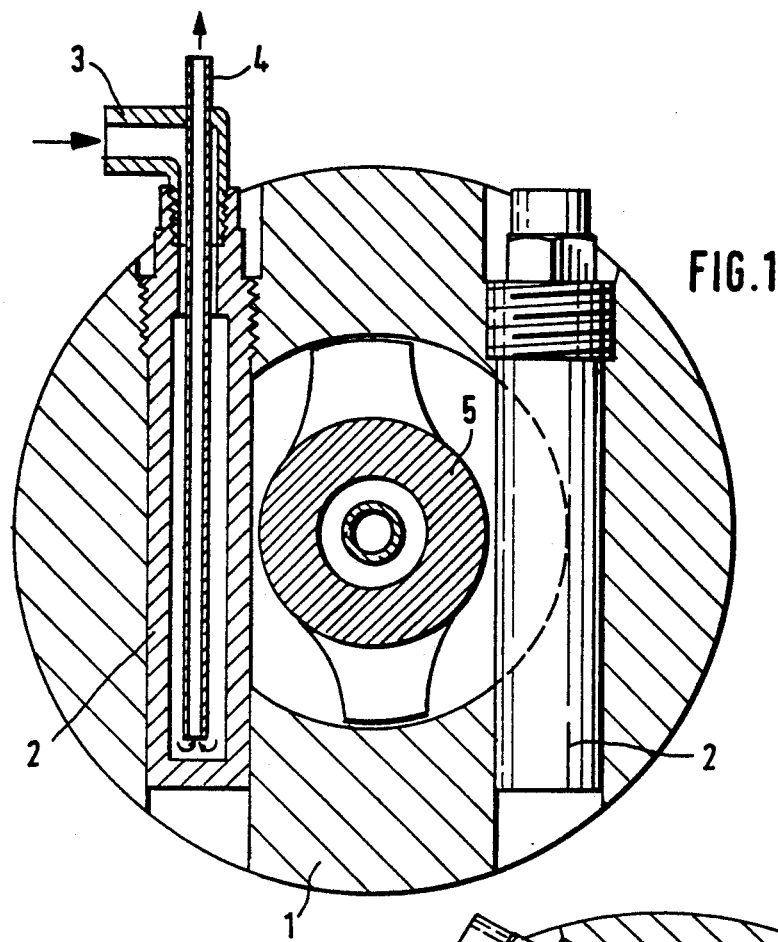
FIG. 1 is a section through an extruder with two pins in one radial plane.

In FIG. 1 is seen a section through a single-screw extruder barrel 1 which has no cooling chamber in the plane of section, since this is usually located between the pin planes. The barrel can advantageously be provided with a resin lining to reduce wear, in a known manner. The bores for the accommodation of the pins 2 are here through-bores and they cut through the inside wall of the barrel. The pins inserted into the bores have at one end a head which is threaded and which can be screwed into an internal thread in the bore. A hexagon-shaped driver on its head serves for this purpose. The pin reaches into this bore so far that it is fixedly held in the bore at both ends. The pin is longer for this reason than the greatest length of the bore inside of the barrel. Since the pin reaches into the interior of the barrel with only a small portion of its circumferential surface, it is entirely impossible for this pin to break off. The pin is so arranged that it does not contact the root of the screw nor the flanks of its helix.

By means of an entrance tube 3 and an exit tube 4 a fluid temperature control can be exercised. Since between the circumference of the pin and the circumference of the screw there is formed a gap diminishing in cross section, it is here that a special treatment of the material takes place.

Figure 2:
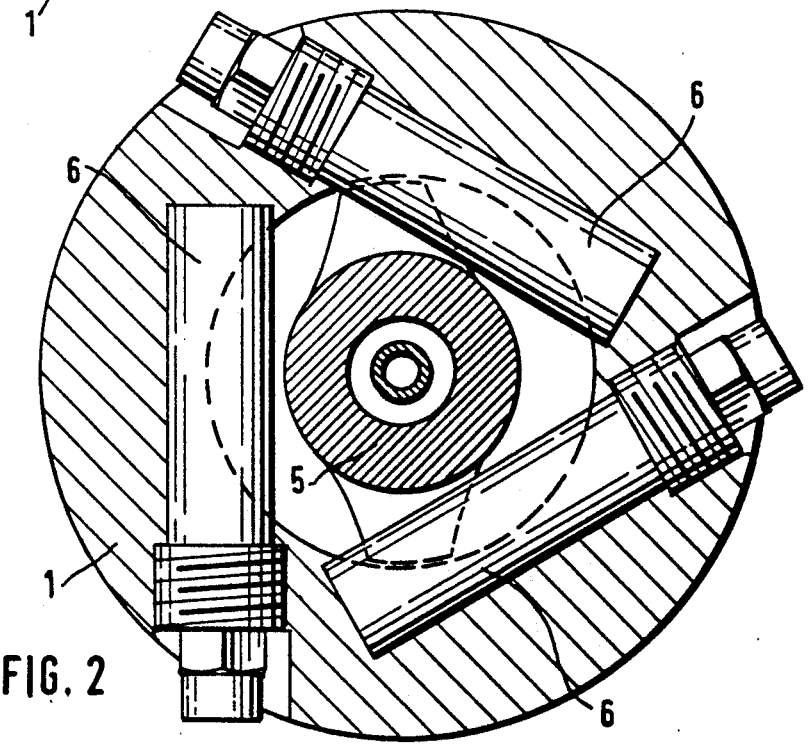
FIG. 2 is a section through an extruder with three pins in one radial plane.

In the embodiment depicted in FIG. 2, three bores are provided which do not go all the way through, for the accommodation of cylindrical pins 6.

Figure 3:
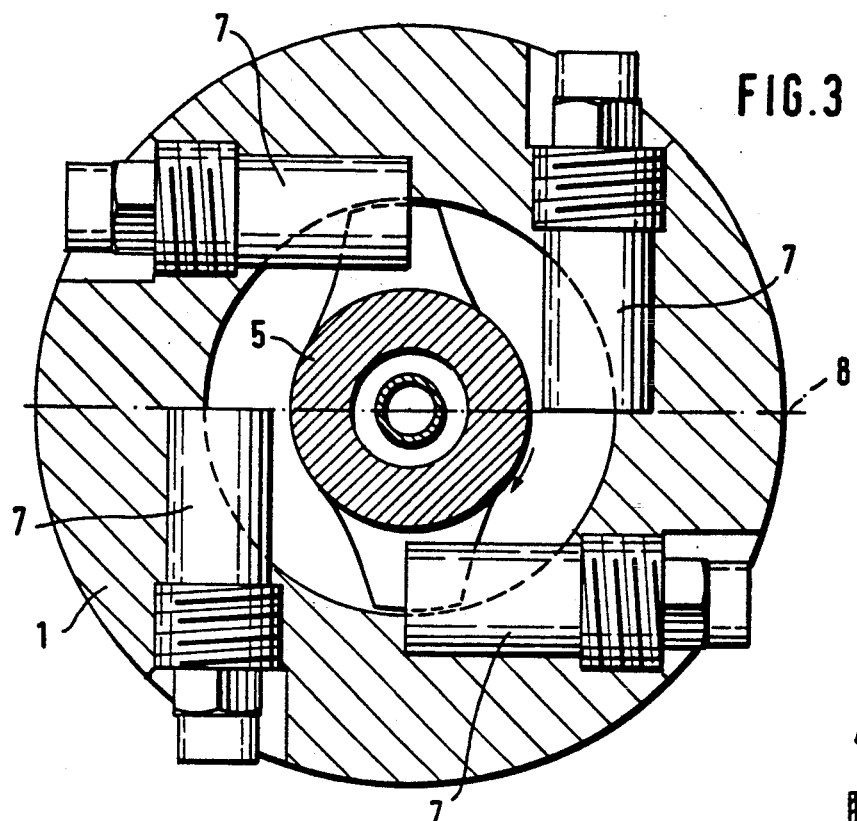
FIG. 3 depicts an extruder having four cylindrical pins reaching only partially into the interior of the extruder.

In the embodiment depicted in FIG. 3, four bores are provided, which bottom all in one radial plane. The cylindrical pins 7 used in this case form radial end faces in the path of the screw and behind them a decompression of the material and at the same time an especially good mixing of the material takes place. At this point bores can be provided in the barrel wall to serve for the removal of gas from under the extruder stream. The radial plane in which the end faces of two pins 7 lies is provided with the reference number 8 and runs through the axis of the screw.

Figure 4:
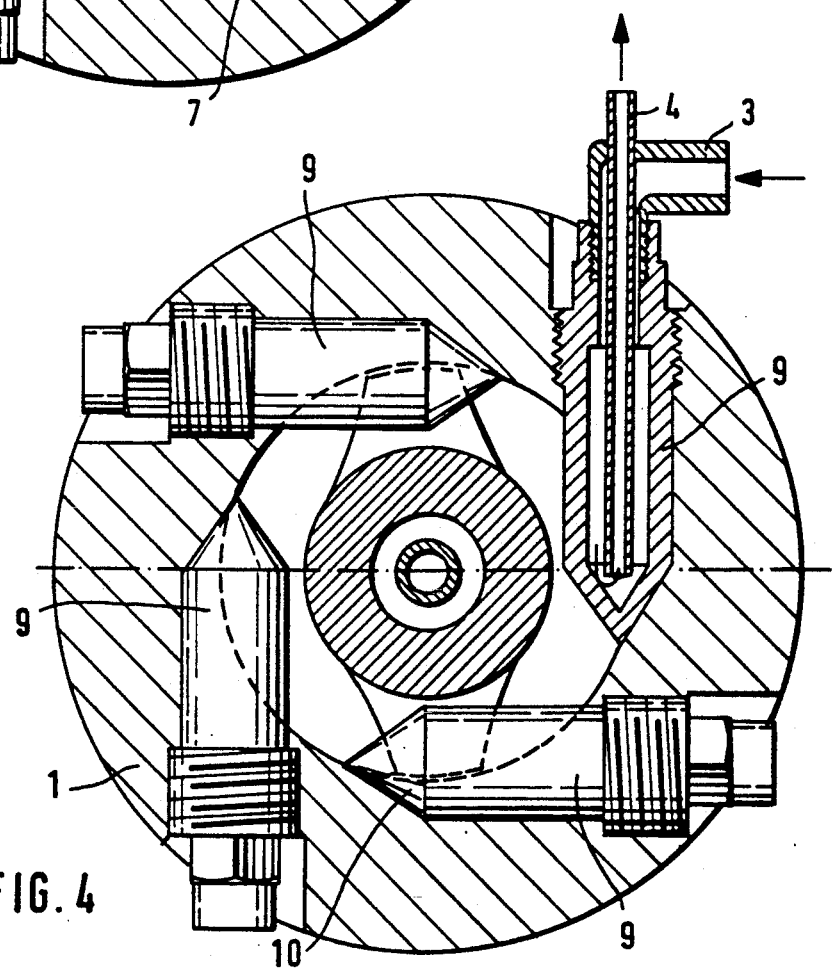
FIG. 4 depicts an extruder with four pins with cone-shaped ends.

In the embodiment depicted in FIG. 4, four pins 9 are disposed in one radial plane, which are cylindrical over a great part of their length, but are cone-shaped at the end. The circumferential surface of this cone 10 places itself against the bore which at this point is also conical, so that no dead corners are formed.

Figure 5:
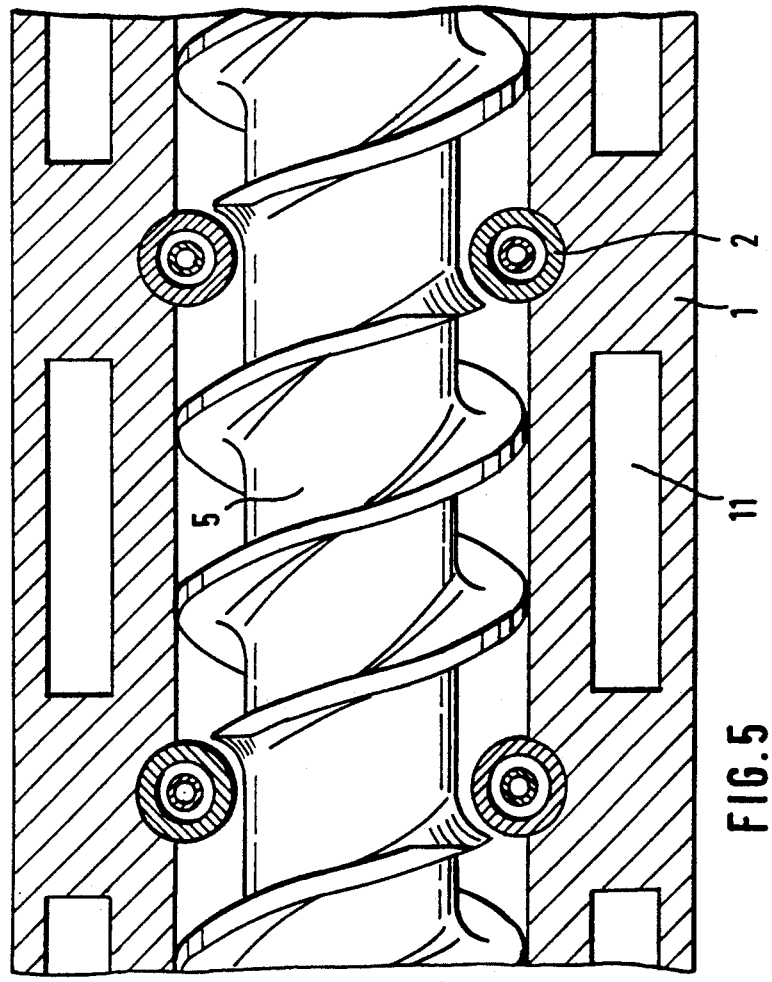
FIG. 5 is a part of a longitudinal section through an extruder.

FIG. 5 shows a portion of a longitudinal section through the screw extruder with pins 2 in two radial planes. Between these radial planes cooling passages 11 are provided in the barrel wall.

Figure 6:
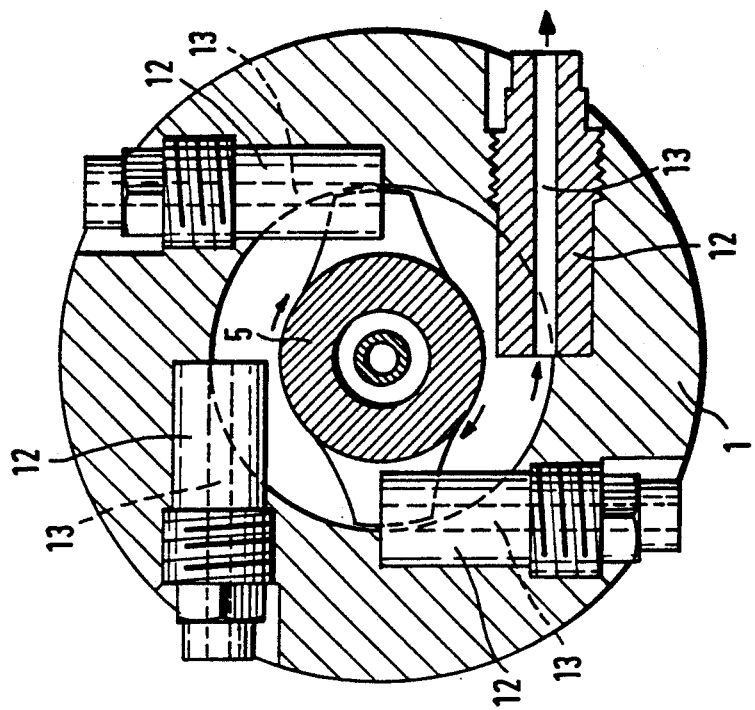
FIG. 6 is a section of an extruder similar to the one depicted in FIG. 3, having four pins which, however, are bored lengthwise for the purpose of exhausting gas through a vacuum to be applied from the exterior or for injecting gas.

To permit exhausting gases from an area of the extruder, the screw in known extruders has been cut deeper in the exhaust zone with the disadvantage that then less torque could be transmitted. Another was to provide a recess in this exhaust zone in the barrel, which calls for greater complexity of manufacture. In contrast to this, in the case of the embodiment shown in FIG. 6, the length of the pins—in a manner similar to the embodiment according to FIG. 3—is shortened in the exhaust area, and these pins 12 are provided each with a through bore 13 opening in the end face of the pin, inside of the barrel 1, and the exhaust vacuum is applied to that bore from the exterior. On the other hand, in special cases a compressed gas, a liquid or an additive, plastified by melting, for example, can be injected under pressure through the bore 13.

Figure 7:
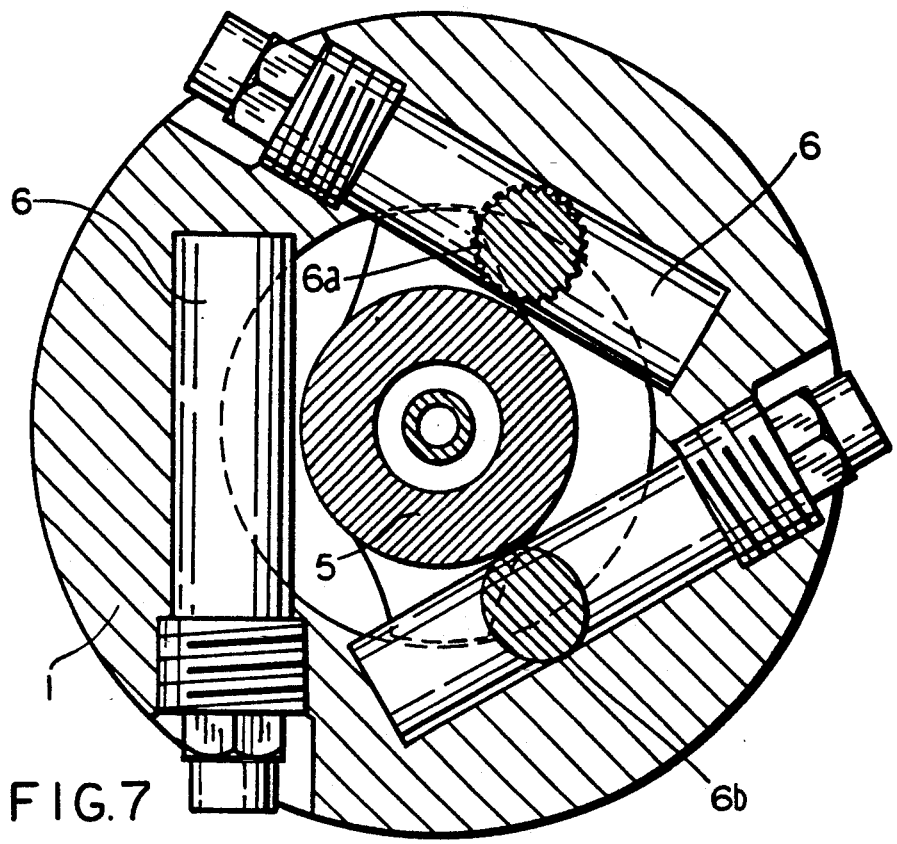
FIG. 7 is a section through an extruder illustrating different pin cross-section shapes including pins having a fluted cross-section and an unround cross-section.
Figure 8:
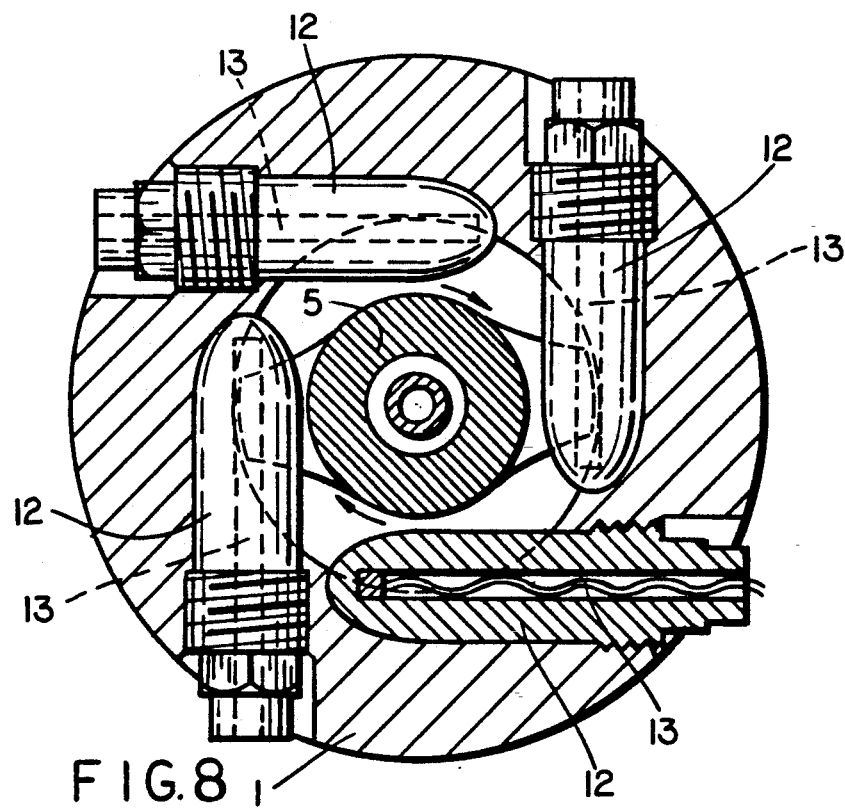
FIG. 8 is a section of an extruder showing pins with elliptoid end portions, and showing a pin with a cavity and a sensor therein.

FIG. 7 illustrates pins having a fluted cross-section 6a and an unround cross-section 6b. FIG. 8 illustrates pins having an elliptoid end portion 14. A cavity 15 may be provided in the pin for accommodating therein a sensor or probe 16.

In these embodiments of the pin system it is advantageous for the pins to be tapered or elliptical in longitudinal section 14, or unround in cross section 6b at the portion of the pin situated within the barrel. Using pins of the this type can improve the plastifying action with respect to a particular substance being extruded, as pins of various configurations can be used which are particularly well adapted for certain substances. Furthermore, the plastifying action of the pins can be varied during operation without replacing the pins, as the pins with unround cross sections can be simply rotated in place to present a configuration of different shape.

Special effects can be produced by providing portions of the circumferential surface of the pins with recesses, especially in the form of grooves 6a, which are preferably set askew. This substantially accelerates the softening of the material, as the grooves act on material which often escapes the softening action of ordinary pins.

A cavity 15 may be provided within the pin to accommodate a sensor 16 therein.

I claim:

1. A screw extruder comprising:
    a barrel having a barrel wall and a substantially cylindrical longitudinal bore through the barrel defined by the inside of the barrel wall,
    a screw rotatably disposed in the barrel bore,
    at least one pin bore accommodating a pin therein, the pin comprising a body and two end faces, the pin bore being disposed through the barrel wall and reaching through to the inside of the barrel wall and into said barrel bore, the pin bore being disposed in tangential relation to the cross-section of the barrel bore,
    the pin bore being formed such that a pin residing therein extends at least partially into the barrel bore to reside within a gullet of the screw, and the pin is supported along its entire length against the pin bore.

2. The screw extruder of claim 1, wherein a portion of one end face of the pin resides within the barrel bore.

3. The screw extruder of claim 2, wherein said one end face of the pin has a cone shape, and the pin bore has a conforming shape to accommodate the cone-shaped end face such that the cone-shaped end face is supported along its entire length against the pin bore.

4. The screw extruder of claim 1, wherein neither end face of the pin resides within the barrel bore.

5. The screw extruder of claim 1, wherein the cross-section of a portion of the pin body residing within the barrel bore is non-circular.

6. The screw extruder of claim 1, wherein a longitudinal dimension of the pin is elliptical.

7. The screw extruder of claim 1, wherein the pin has a temperature control apparatus therein.

8. The screw extruder of claim 1, further comprising a cavity within the pin, and a sensor disposed within the cavity, said cavity being closed at one end thereof and open at the other end thereof, such that said cavity is in communication with the outside of the barrel.

9. The screw extruder of claim 1, comprising a plurality of pins and corresponding pin bores disposed in a common plane in radial relation to the barrel bore.

10. The screw extruder of claim 1, comprising a plurality of pins and corresponding pin bores disposed along the length of the barrel.

11. The screw extruder of claim 1, wherein the pin comprises a plurality of grooves in the outer surface thereof, said grooves being set askew from one another.

12. The screw extruder of claim 1, wherein the pin has a bore therethrough for fluid communication between the outside of the barrel and the barrel bore.

* * * * *